(12) United States Patent
Schumacher et al.

(10) Patent No.: US 9,452,780 B2
(45) Date of Patent: Sep. 27, 2016

(54) DRIVER ASSISTANCE SYSTEM

(71) Applicant: Robert Bosch GmbH, Stuttgart (DE)

(72) Inventors: Jan Schumacher, Ludwigsburg (DE); Frank Beruscha, Kleinglattbach (DE); Pascal Kocher, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/420,868

(22) PCT Filed: Jul. 9, 2013

(86) PCT No.: PCT/EP2013/064425
§ 371 (c)(1),
(2) Date: Feb. 10, 2015

(87) PCT Pub. No.: WO2014/029547
PCT Pub. Date: Feb. 27, 2014

(65) Prior Publication Data
US 2015/0217807 A1   Aug. 6, 2015

(30) Foreign Application Priority Data
Aug. 24, 2012  (DE) ........................ 10 2012 215 057

(51) Int. Cl.
B60W 10/00 (2006.01)
B62D 15/02 (2006.01)
(Continued)

(52) U.S. Cl.
CPC ............ *B62D 15/025* (2013.01); *B60W 10/04* (2013.01); *B60W 10/20* (2013.01); *B60W 30/12* (2013.01); *B60W 30/14* (2013.01); *B60W 30/16* (2013.01); *B60W 30/17* (2013.01); *B60W 50/10* (2013.01); *B60W 50/14* (2013.01); *B62D 15/026* (2013.01);
(Continued)

(58) Field of Classification Search
CPC combination set(s) only.
See application file for complete search history.

(56) References Cited

U.S. PATENT DOCUMENTS 6,275,231 B1 * 8/2001 Obradovich ........ B60R 16/0231
345/156
6,282,478 B1 * 8/2001 Akita ..................... B60K 31/00
303/125

(Continued)

FOREIGN PATENT DOCUMENTS

DE   199 48 913   5/2000
DE   101 14 470   9/2002
(Continued)

OTHER PUBLICATIONS

International Search Report for PCT/EP2013/064425, dated Dec. 3, 2013.

*Primary Examiner* — Jonathan L Sample
(74) *Attorney, Agent, or Firm* — Norton Rose Fulbright US LLP

(57) ABSTRACT

A driver assistance system for a motor vehicle includes: a longitudinal guide controller; a transverse guide controller; at least one operating element via which the transverse guide controller is able to be activated only in common with, or in addition to, the longitudinal guide controller; a steering sensor which detects an operation of the steering wheel by the driver, the transverse guide controller being able to be deactivated by a signal of the steering sensor without the longitudinal guide controller being deactivated; and a brake pedal sensor which detects an operation of the brake pedal of the vehicle, the transverse guide controller and the longitudinal guide controller being able to be deactivated by a signal of the brake pedal sensor.

9 Claims, 2 Drawing Sheets

(51) Int. Cl.
*B60W 50/10* (2012.01)
*B60W 50/14* (2012.01)
*B60W 10/04* (2006.01)
*B60W 10/20* (2006.01)
*B60W 30/12* (2006.01)
*B60W 30/14* (2006.01)
*B60W 30/16* (2012.01)
*B60W 30/17* (2012.01)
*B60W 50/00* (2006.01)

(52) U.S. Cl.
CPC ............ *B60W 2050/0072* (2013.01); *B60W 2050/0095* (2013.01); *B60W 2520/10* (2013.01); *B60W 2540/10* (2013.01); *B60W 2540/12* (2013.01); *B60W 2540/18* (2013.01)

(56) References Cited

U.S. PATENT DOCUMENTS

| | | | | |
|---|---|---|---|---|
| 8,392,064 | B2* | 3/2013 | Thrun | B62D 15/025 701/41 |
| 9,168,924 | B2* | 10/2015 | Lee | B60W 50/04 |
| 2002/0044047 | A1* | 4/2002 | Miyakoshi | B60K 31/0008 340/435 |
| 2002/0177935 | A1* | 11/2002 | Winner | B60K 31/0008 701/93 |
| 2004/0065493 | A1* | 4/2004 | Klotz | B62D 6/00 180/169 |
| 2005/0055150 | A1* | 3/2005 | Uhler | B60W 30/16 701/93 |
| 2005/0125125 | A1* | 6/2005 | Matsumoto | G08G 1/167 701/41 |
| 2005/0143893 | A1* | 6/2005 | Takamatsu | B60W 10/04 701/91 |
| 2007/0203617 | A1* | 8/2007 | Haug | B62D 15/029 701/1 |
| 2007/0272464 | A1* | 11/2007 | Takae | B60W 10/06 180/169 |
| 2008/0091318 | A1* | 4/2008 | Deng | B62D 6/003 701/41 |
| 2008/0172153 | A1* | 7/2008 | Ozaki | B60T 8/17557 701/36 |
| 2009/0212930 | A1* | 8/2009 | Pfeiffer | B60Q 9/008 340/435 |
| 2010/0106356 | A1* | 4/2010 | Trepagnier | G01S 17/023 701/25 |
| 2010/0191421 | A1* | 7/2010 | Nilsson | B62D 15/025 701/41 |
| 2010/0222960 | A1* | 9/2010 | Oida | B60G 17/0195 701/31.4 |
| 2011/0199200 | A1* | 8/2011 | Lueke | B60Q 1/38 340/435 |
| 2012/0136540 | A1* | 5/2012 | Miller | B62D 5/001 701/42 |
| 2012/0150411 | A1* | 6/2012 | Oosawa | B60K 31/0008 701/96 |
| 2012/0283911 | A1* | 11/2012 | Lee | B60W 50/085 701/41 |
| 2012/0283913 | A1* | 11/2012 | Lee | B62D 15/025 701/41 |
| 2013/0253767 | A1* | 9/2013 | Lee | B60W 50/04 701/42 |

FOREIGN PATENT DOCUMENTS

| | | |
|---|---|---|
| DE | 10 2007 052 258 | 6/2008 |
| DE | 10 2010 032 621 | 3/2011 |
| DE | 10 2009 050 399 | 5/2011 |
| EP | 2 098 431 | 9/2009 |
| JP | 2005 239155 | 9/2005 |

* cited by examiner

DRIVER ASSISTANCE SYSTEM

BACKGROUND OF THE INVENTION

1. Field of the Invention

The present invention relates to a driver assistance system having a longitudinal guide controller and a transverse guide controller.

2. Description of the Related Art

Published German patent application document DE 10 2007 052 258 A1 describes a driver assistance system for the transverse guidance of a motor vehicle having a transverse control device in which the transverse control device changes from the activated state to the deactivated state if a detection device detects that at least one hand is being put on the steering wheel of the vehicle, which had not been touched before. In one example, the transverse control device changes from the deactivated state to the activated state when a detection device detects that the steering wheel, which was touched before by at least one hand, is untouched. In one example, having an activated ACC system for the longitudinal guidance of the vehicle, the vehicle accelerates to a maximum vehicle speed that is predetermined by the ACC system, after a predetermined first limit speed has been exceeded, if at least one hand of the driver is located on the steering wheel of the vehicle and the roadway of the vehicle is free, for instance, upon the breakup of a traffic jam.

Published German patent application document DE 101 14 470 A1 describes a lane keeping and vehicle speed control device for motor vehicles, in which a lane keeping support system (LKS) is able to be switched by a separate main switch, independently of a speed controller, into an operationally ready state and, in the operationally ready state, is able to be activated by the same switch-on signal as the speed controller. Upon the operation of the accelerator, together with the speed controller, the automatic lane keeping function is also supposed to be temporarily suspended and then to set in again. Upon deactivation of the speed controller by the driver, in order to allow the vehicle to roll to a setpoint speed, the lane holding function should remain activated, provided the driver is not actively operating the accelerator or intervening in the steering. At a vehicle speed below 40 km/h, the control circuits are automatically switched off.

Published German patent application document DE 10 2009 050 399 A1 describes a method for controlling the operation of a fully automatic driver assistance system of a motor vehicle, that is developed for independent vehicle guidance, in which upon the reaching of a system limit of the driver assistance system, which requires the taking over of the vehicle guidance by the driver, in addition to a driver takeover request, a plan of action is executed in order to transfer the vehicle into a safe state, particularly the standstill of the motor vehicle, by driving interventions. In response to the taking over of the vehicle guidance by the driver, which is recognized, for example, by the driver operating the steering wheel and/or the foot-operated controls, the fully automatic driver assistance system is deactivated again.

Published German patent application document DE 10 2010 032 621 A1 describes a device and a method for supporting a driver of a motor vehicle in which position-dependent maximum transverse acceleration values, maximum yawing moment values or steering angle boundary values are stored in a travel route memory, and may be supplied to a driving dynamics control and/or regulating device. Corresponding to these setpoint values, an intervention may be undertaken in the longitudinal/transverse movement of the vehicle, in order to limit the longitudinal dynamics and the transverse dynamics of the vehicle as a function of its position. In this context, by monitoring an accelerator position, a steering wheel position and/or a brake pedal position, the deactivation of the device may be achieved if, for example, during evasive, braking and/or passing maneuvers, great setpoint to actual deviations of the positions are registered.

BRIEF SUMMARY OF THE INVENTION

The driver may be relieved in his vehicle guidance by the driver assistance systems known from the related art. It is desirable, however for example, in the case of a traffic jam assistant or a lane keeping assistant, that the driver not be left uncertain, by a multitude of possible system states, about the state of activation of the subsystems, in each case, of the driver assistance system. The activation and deactivation response of the driver assistance system should rather be designed as simply as possible and as easy to recognize as possible for the driver.

It is therefore the object of the present invention to create a driver assistance system which includes a longitudinal and a transverse regulation, in which the activation and the deactivation of the longitudinal and/or transverse regulation takes place in a manner that is as intuitive as possible for the driver.

According to the present invention, this object is attained by a driver assistance system for motor vehicles, which comprises:
  a longitudinal guide controller, which is designed to act upon the drive system of the vehicle,
  a sensor device for detecting a travel lane,
  a transverse guide controller for evaluating signals of the sensor device and for outputting steering commands to a steering actuator of the vehicle,
  at least one operating element by which the transverse guide controller is able to be activated only in common with or in addition to the longitudinal guide controller,
  a steering sensor which detects an operation of the steering wheel of the vehicle by the driver, the transverse guide controller being able to be deactivated by a signal of the steering sensor, without the longitudinal guide controller being deactivated, and
  a brake pedal sensor which detects an operation of the brake pedal of the vehicle, the transverse guide controller and the longitudinal guide controller being able to be deactivated by a signal of the brake pedal sensor.

Consequently, an activation hierarchy for the longitudinal guide controller and the transverse guide controller may be implemented, according to which the transverse guide controller is able to be activated only in common with, or in addition to the longitudinal guide controller, and the longitudinal guide controller, when the transverse guide controller is activated, is only able to be deactivated in going along with a deactivation of the transverse guide controller, particularly by the operation of the brake pedal or by the movement of the steering wheel.

In a first step of the activation hierarchy, only the longitudinal guide controller is activated, but not the transverse guide controller.

In a second hierarchy step, the longitudinal guide controller and the transverse guide controller are activated together. The transverse guide controller, which is perceived as being the assistance system most greatly intervening in the driving behavior, thus represents an increase over the sole activation of the longitudinal guide controller.

This concept of the activation hierarchy is particularly intuitively understood by the driver. The overriding of the steering regulation of the transverse guide controller by the driver, in that the driver applies a steering torque, that exceeds a threshold value, to the steering wheel, for example, or that the driver rotates the steering wheel by an angular amount exceeding a threshold value, may signal an interpretation of the traffic situation by the driver that deviates from the interpretation of the transverse guide controller, or it may signal the desire of the driver to take over the steering of the vehicle, and therefore leads to the durable deactivation of the transverse guide controller. This corresponds to the transition to the first hierarchy step.

A braking intervention of the driver presumably represents a measure for the sake of safety, and may therefore signal an estimate of the situation by the driver with regard to the caution required that deviates from the interpretation of the driver assistance system. Therefore, by a braking intervention, a deactivation takes place, both of the longitudinal guide controller and the transverse guide controller, so that a complete handing over of the control of the vehicle to the driver is enabled.

Consequently, when the driver overrides the control functions of the driver assistance system, in a potentially safety-relevant manner, by a steering intervention or a braking intervention, the system is brought into an operating state that is intuitively comprehensible to the driver. Then, specifically at a given time, the driver may change again to a higher hierarchy step of the activation hierarchy by using the at least one operating element.

For example, the driver assistance system may include a deactivating device which is designed to deactivate the transverse guide controller, controlled by a signal of the steering sensor, without deactivating the longitudinal guide controller, the deactivating device being further designed, controlled by a signal of the brake pedal sensor, to deactivate the transverse guide controller and the longitudinal guide controller.

The steering sensor is preferably designed to detect a steering torque applied by the driver to the steering wheel of the vehicle. Thus, it forms a steering torque sensor.

Furthermore, the driver assistance system preferably has an accelerator sensor, which detects an operation of the accelerator, the transverse guide controller being able to be deactivated by a signal of the accelerator sensor, without the longitudinal guide controller being deactivated. A signal of the accelerator sensor preferably has the effect on the longitudinal guide controller of a temporary suspension of the control function of the longitudinal guide controller, for the duration of the operation of the accelerator. The overriding of the speed control function of the driver assistance system by the driver thus deactivates the transverse guide controller. The operation of the accelerator represents a forceful intervention in the control functions of the driver assistance system, so that the driver experiences it as understandable if the transverse guide controller is deactivated as the highest step of the regulation. However, the longitudinal guide controller may remain activated when the accelerator is operated, and be overridden only for the duration of the operation of the accelerator, because the operation of the accelerator usually signals the desire for greater acceleration, without this being required from the point of view of safety aspects. Such behavior during the overriding of a speed controller may also be familiar to the driver from conventional longitudinal guide controllers, such as an ACC system (adaptive cruise control).

In the case of a transverse control device developed as a traffic jam assistant, for example, one must also take into account, in response to an acceleration of the vehicle by the driver, that an upper limit speed for the transverse guide control will soon be reached. The linking of the deactivation of the transverse guide controller with the operation of the accelerator, a particularly intuitive behavior of the system is effected, since a direct causality is perceived between the deactivating of the transverse guide controller and the operation of the accelerator.

DETAILED DESCRIPTION OF THE INVENTION

Figure 1:
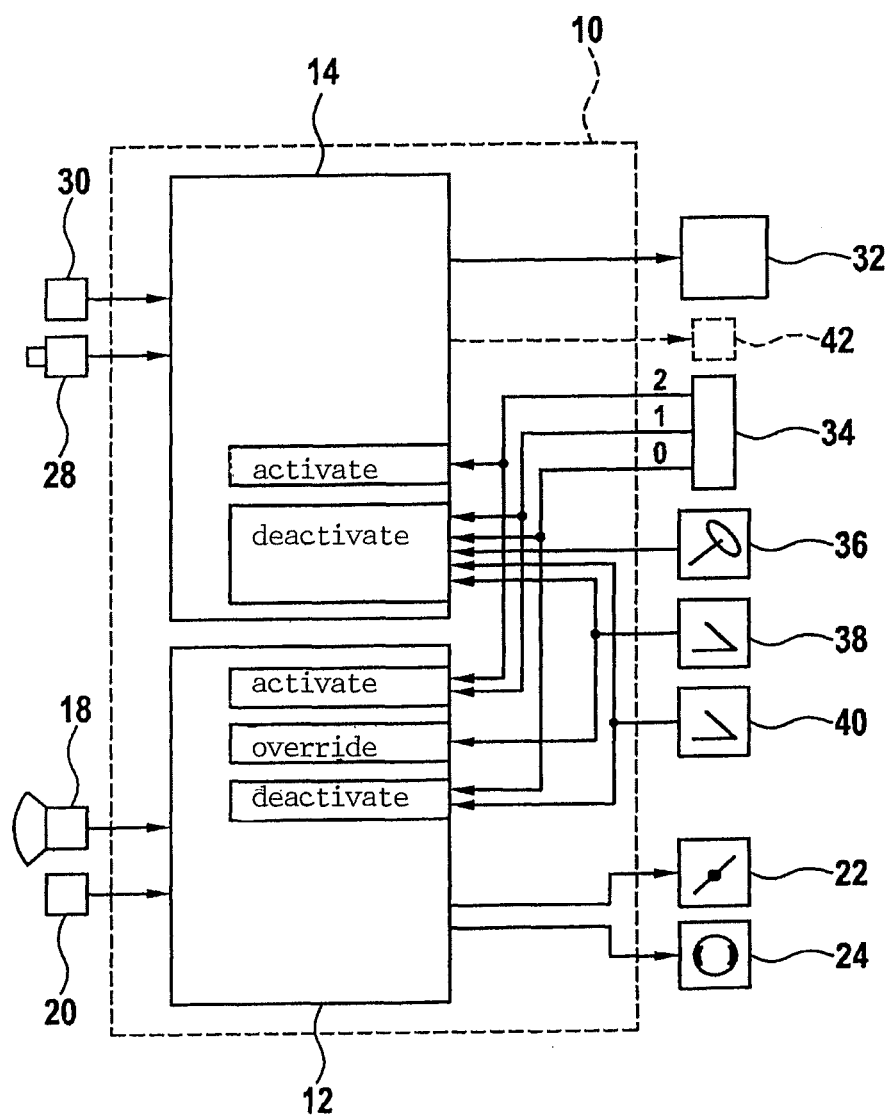
FIG. 1 shows a block diagram of a driver assistance system according to the present invention.

The driver assistance system shown in FIG. 1 includes a longitudinal guide controller 12 and a transverse guide controller 14, which may be implemented, for instance, in the form of an electronic circuit 10.

Longitudinal guide controller 12 forms a speed controller, in particular an adaptive speed controller in the form of an ACC system (adaptive cruise control). Longitudinal guide controller 12 is designed, based on the locating data of a locating system 18 and travel state parameters, for instance, a driving speed of the vehicle ascertained by speed sensor 20, to match the speed of one's own (the host) vehicle to the speed of a preceding vehicle and to regulate the distance from the preceding vehicle to a suitable value, by intervention in a drive system 22 and a braking system 24 of the vehicle. Locating system 18 may include a radar sensor, for example, a radar sensor having angular resolution, for example, which enables locating a preceding vehicle and determining its relative speed.

In an activated state of longitudinal guide controller 12, it regulates the travel speed within the scope of an upper speed limit that is able to be set by the driver as a setpoint value, based on the locating data, especially the distance and the relative speed of a target object, and the travel state parameters, in order to maintain a target distance from the preceding vehicle, the target object. The target distance is a function of speed, for example, and is usually specified in the form of a time interval from the preceding vehicle. The time interval may be selected by the driver, for example.

Longitudinal guide controller 12 is particularly a stop-and-go ACC system and is designed to brake the vehicle to a standstill, within the scope of the speed regulation and the distance regulation of the vehicle, if the preceding vehicle remains standing, and, when the preceding vehicle starts moving again, to start up the host vehicle automatically and to continue the speed regulation.

In the case of a free lane in front of the host vehicle, longitudinal guide controller 12 regulates the travel speed to the setpoint value of the speed specified by the driver.

Transverse guide controller 14 forms a traffic jam assistant, for example, which is designed to guide the host vehicle automatically and autonomously in a traffic lane, based on signals of a sensor device 28 for detecting a traffic lane and based on signals of a steering angle sensor 30, by outputting steering commands to a steering actuator 32 of the vehicle. Transverse guide controller 14 is designed to carry out the steering of the vehicle autonomously in a traffic jam situation within a limited speed range. The speed range may have an upper limit at 30 km/h or 40 km/h, for example.

For the steering regulation, transverse guide controller 14 detects, for example, using a sensor device 28, which may include one or more video cameras, a deviation of the host vehicle from a setpoint driving tube within a detected traffic lane, and calculates a corresponding correction command, which is output to steering actuator 32. Traffic lane boundaries are recognized, for instance, with the aid of continuous or interrupted traffic lane markings or other visible features in the recorded images of sensor device 28.

Electronic circuit 10 includes a programmable electronic data processing device, for example, which is designed for carrying out calculations of longitudinal guide controller 12 and/or of transverse guide controller 14, and/or includes longitudinal guide controller 14 and/or transverse guide controller 14.

The driver is able to activate and deactivate longitudinal guide controller 12 and transverse guide controller 14 via an operating element 34. Operating element 34 includes a selector switch or keys, for example. In this context, transverse guide controller 14 is able to be activated only in common with, or in addition to longitudinal guide controller 12, and longitudinal guide controller 12, when transverse guide controller 14 is activated, is able to be deactivated only going along with a deactivation of transverse guide controller 14.

Longitudinal guide controller 12 and transverse guide controller 14 are able to be activated in two stages: In a Stage 1, only longitudinal guide controller 12 is activated. In a Stage 2, both controllers 12, 14 are activated.

If a Stage 0 is selected, both longitudinal guide controller 12 and transverse guide controller 14 are actuated to become deactivated, provided they were still activated. This is shown in FIG. 1 by a signal path "0".

If Stage 1 is selected, which is characterized in FIG. 1 by a signal path "1", then, in response to a deactivated longitudinal guide controller 12, longitudinal guide controller 12 is actuated to become activated, i.e. a transition takes place from Stage 0 to Stage 1. When controllers 12, 14 are already activated, when Stage 1 is selected, transverse guide controller 14 is actuated to become deactivated, corresponding to a transition from Stage 2 to Stage 1.

If Stage 2 is selected, transverse guide controller 14 is actuated to become activated, and longitudinal guide controller 12 is actuated to become activated, in case it was not yet activated. This is made clear in FIG. 1 by a signal path "2".

A steering sensor in the form of a steering wheel torque sensor 36 is designed to detect a steering torque exerted by the driver on the steering wheel, and upon the exceeding of a threshold value, to output a corresponding signal. The signal of steering wheel torque sensor 36 actuates transverse guide controller 14 to become deactivated, as is shown in FIG. 1 as a signal path. The signal of steering wheel torque sensor 36 leaves longitudinal guide controller 12 unaffected.

An accelerator sensor 38 detects an operation of the accelerator of the vehicle, for instance, a downward motion of the pedal that exceeds a threshold value or a force exerted on the accelerator or a torque, which exceed(s) a threshold value. A corresponding signal of accelerator sensor 38 controls transverse guide controller 14 to become deactivated. In addition, the signal actuates longitudinal guide controller 12 to the temporary overriding of the regulation of longitudinal guide controller 12. Corresponding signal paths are shown in FIG. 1 by arrows. Upon receipt of the signal from steering wheel torque sensor 36, longitudinal guide controller 12 is designed to suspend the regulating function for the duration of the operation of the accelerator, so that the vehicle is controlled according to the specification of the driver via the accelerator. When the accelerator is released, the speed regulation of longitudinal guide controller 12 gently sets in again.

A brake pedal sensor 40 detects an operation of the brake pedal by the driver. It is able to work in a corresponding manner as that explained above for the accelerator sensor. A corresponding signal controls both longitudinal guide controller 12 and transverse guide controller 14 to become deactivated. The signal paths are shown in FIG. 1 by arrows. The parts of the system providing the signals of steering wheel torque sensor 36, accelerator sensor 38 and brake pedal sensor 40 and the parts processing the signals of longitudinal guide controller 12 and of transverse guide controller 14 thus form a deactivation device which is designed, controlled by a signal of steering wheel torque sensor 36 or of accelerator sensor 38, to deactivate transverse guide controller 14, without deactivating longitudinal guide controller 12, the deactivation device being further designed, controlled by a signal of brake pedal sensor 40, to deactivate transverse guide controller 14 and longitudinal guide controller 12.

Figure 2:
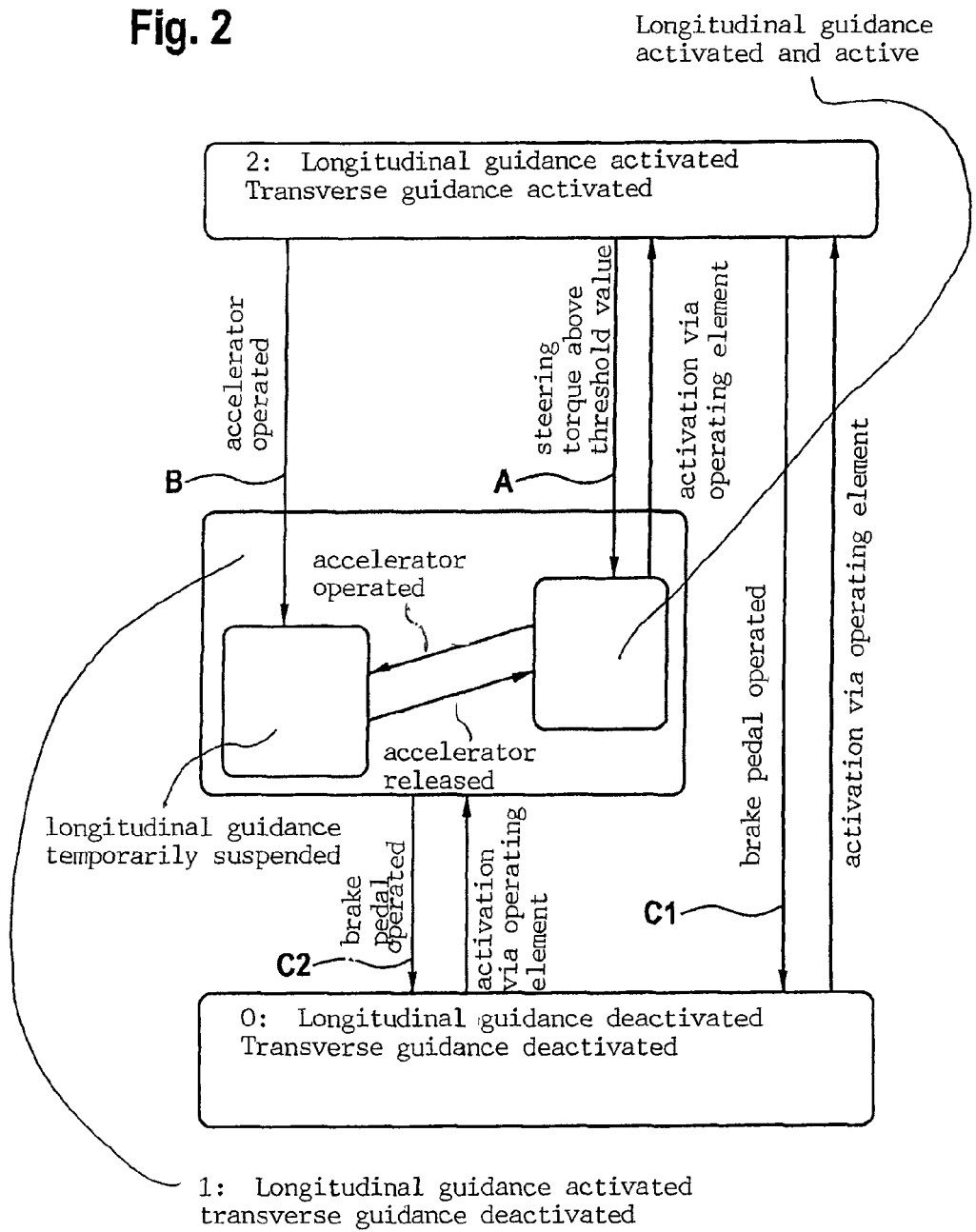
FIG. 2 shows a schematic diagram illustrating activation states of a longitudinal guide controller and a transverse guide controller of the system.

Via the signals of steering wheel torque sensor 36, accelerator sensor 38 and brake pedal sensor 40, the driver has three ways to override the driver assistance system at activated longitudinal guide controller 12 and activated transverse guide controller 14 (Stage "2"), as is shown in FIG. 2.

If the driver applies a steering torque that is above the threshold value that is parameterized, for example, as a function of speed, a deactivation (A) takes place of transverse guide controller 14. The threshold value decreases, for example, with increasing speed, so that, at particularly low speeds, a more forceful steering intervention is required to override the system. The system goes over into an activation state having an activated longitudinal guide controller 12 and a deactivated transverse guide controller (Stage 1). Taking up again the transverse regulation, by the transverse guide controller, has to be explicitly demanded by the driver using operating element 34.

In preparation for the possible taking over of the transverse regulation by the driver, the driver is able to put his hands on the steering wheel already beforehand, without the transverse guide controller being already activated thereby.

The longitudinal regulation by longitudinal guide controller 12 is able to be overridden by the driver operating the accelerator. Longitudinal guide controller 12 remains activated, in this context. The longitudinal regulation is taken up again as soon as the accelerator is released. To the extent that the transverse regulation by transverse guide controller 14 was still activated during the operating of the accelerator, it is deactivated (B) by operating the accelerator. In this context, the longitudinal guidance by longitudinal guide controller 12 is at the same time temporarily overridden, until the accelerator is released again.

Furthermore, the longitudinal guidance and the transverse guidance by controllers 12, 14 may be overridden by the driver operating (C1) the brake pedal. In this case, both longitudinal guide controller 12 and transverse guide controller 14 are deactivated (Stage "0"). If longitudinal guide controller 12 was exclusively activated, it is also deactivated (C2) by operating the brake pedal. If longitudinal and transverse guidance are deactivated, they may be activated again using operating element 34, but the transverse guidance may not be activated without the longitudinal guidance.

According to one exemplary embodiment, it may be provided that, during a deactivation of the transverse guide controller, a takeover request signal is output to the driver if the driver does not yet have his hand on the steering wheel, or if the driver does not yet exert any steering torque on the steering wheel above the threshold value.

FIG. 1 shows in a dashed line a signaling element 42 for outputting a takeover request signal to the driver. This signal may be, for example, a warning tone and/or a light signal. If a takeover request to the driver takes place, the steering regulation is removed temporarily by transverse guide controller 14 for a short takeover time, in order to give the driver the opportunity of taking over the steering. A takeover of the steering by the driver is recognized from a signal of a steering wheel sensor, which detects an operation of the steering wheel by the driver. The steering wheel sensor may be steering wheel torque sensor 36, for instance. The steering takeover may then be recognized from the signal which indicates a steering torque applied to the steering wheel by the driver. Additionally or alternatively, a steering wheel sensor may be provided in the form of a touch sensor, which detects a touch of the steering wheel by the driver. The takeover of the steering by the driver may then be detected, based on a signal of the additional steering wheel sensor, which indicates a touch of the steering wheel by the driver. If the signal of the steering wheel sensor indicates that a guidance of the steering wheel by the driver is taking place, the output of the takeover request signal may be ended.

The takeover request procedure may, for instance, be a component of the deactivation of transverse guide controller 14, if the deactivation is effected by the signal of accelerator sensor 38 and/or by the signal of brake pedal sensor 40.

While the examples described refer to a transverse guide controller 14, which is able to take over an autonomous steering of the vehicle, it is of course also conceivable that transverse guide controller 14 is a controller which intervenes only in a supporting manner in the steering of the vehicle effected by the driver. For example, transverse guide controller 14 may be a lane keeping assistant, which, in the case of a required steering correction, exerts a correction torque on the steering wheel or the steering column of the vehicle, via steering actuator 32, to which the driver may yield by a corresponding motion of the steering wheel. If the driver yields to the correction torque, a corresponding intervention in the steering of the vehicle takes place.

What is claimed is:

1. A driver assistance system for a host motor vehicle, comprising:
   a longitudinal guide controller configured to act upon a drive system of the host vehicle;
   a sensor device for detecting a travel lane;
   a transverse guide controller evaluating signals of the sensor device and outputting steering commands to a steering actuator of the host vehicle;
   at least one operating element by which the transverse guide controller and the longitudinal guide controller are selectively activated;
   a steering sensor which detects an operation of the steering wheel of the vehicle by the driver, wherein the transverse guide controller is deactivated by a signal of the steering sensor, without the longitudinal guide controller being deactivated; and
   a brake pedal sensor which detects an operation of the brake pedal of the vehicle, wherein the transverse guide controller and the longitudinal guide controller are deactivated by a signal of the brake pedal sensor;
   wherein there is an activation hierarchy for the longitudinal guide controller and the transverse guide controller, according to which the transverse guide controller is activatable only in common with or in addition to the longitudinal guide controller, and according to which the longitudinal guide controller, when the transverse guide controller is activated, is deactivatable in going along with a deactivation of the transverse guide controller, by an operation of the brake pedal or by a movement of the steering wheel.

2. The driver assistance system as recited in claim 1, further comprising:
   an accelerator sensor which detects an operation of the accelerator of the vehicle, wherein the transverse guide controller is deactivated by a signal of the accelerator sensor, without the longitudinal guide controller being deactivated.

3. The driver assistance system as recited in claim 2, further comprising:
   a signaling element for outputting a takeover request signal to the driver of the vehicle, wherein, in response to a deactivation by the signal of the accelerator sensor, the transverse guide controller is configured to actuate the signaling element to output a takeover request signal to the driver and temporarily to continue the regulating function of the transverse guide controller for a takeover period, at least to the extent that no signal is generated by a steering wheel sensor within the takeover time, which indicates a guidance of the steering wheel by the driver.

4. The driver assistance system as recited in claim 2, wherein the longitudinal guide controller is configured such that a signal of the accelerator sensor brings about a temporary suspension of the regulating function of the longitudinal guide controller for the duration of the operation of the accelerator.

5. The driver assistance system as recited in claim 2, wherein the steering sensor is configured to detect a steering torque applied by the driver to the steering wheel of the vehicle.

6. The driver assistance system as recited in claim 2, wherein the transverse guide controller is able to be activated by the at least one operating element only when the speed of the vehicle does not exceed a boundary value.

7. The driver assistance system as recited in claim 2, wherein the transverse guide controller is a traffic jam assistant.

8. The driver assistance system as recited in claim 2, further comprising:
   a locating system for locating objects ahead of the host vehicle, wherein the longitudinal guide controller is an adaptive cruise controller which is configured to match, based on locating data of the locating system, the speed of the host vehicle to the speed of a preceding, located vehicle and to regulate a distance from the preceding vehicle.

9. The driver assistance system as recited in claim 8, wherein the longitudinal guide controller is a stop-and-go controller which is configured to (i) brake the host vehicle to a standstill when the preceding vehicle stops, and (ii) when travel by the preceding vehicle is resumed, start the host vehicle again automatically.

* * * * *